(12) United States Patent
Dsilva et al.

(10) Patent No.: US 10,641,880 B2
(45) Date of Patent: May 5, 2020

(54) VEHICLE LOCATION DEVICE

(71) Applicant: Aptiv Technologies Limited, St. Michael (BB)

(72) Inventors: Jeftha Dsilva, Bangalore (IN); Milton Crasto, Bangalore (IN)

(73) Assignee: Aptiv Technologies Limited (BB)

( * ) Notice: Subject to any disclaimer, the term of this patent is extended or adjusted under 35 U.S.C. 154(b) by 0 days.

(21) Appl. No.: 16/399,002

(22) Filed: Apr. 30, 2019

(65) Prior Publication Data

US 2019/0353766 A1    Nov. 21, 2019

Related U.S. Application Data

(63) Continuation of application No. 15/980,809, filed on May 16, 2018.

(60) Provisional application No. 62/671,768, filed on May 15, 2018.

(51) Int. Cl.
| | |
|---|---|
| *G01S 11/06* | (2006.01) |
| *G01C 21/08* | (2006.01) |
| *G01C 21/16* | (2006.01) |

(52) U.S. Cl.
CPC ............. *G01S 11/06* (2013.01); *G01C 21/08* (2013.01); *G01C 21/16* (2013.01)

(58) Field of Classification Search
CPC .... G01S 17/936; G01S 17/026; G01S 17/933; G01S 7/497; G01S 13/883; G01S 11/06; B60Q 1/0023; G08G 1/166; G01C 21/165; G01C 21/16; G01C 23/00; G01C 3/00; G01C 21/08
See application file for complete search history.

(56) References Cited

U.S. PATENT DOCUMENTS

| | | | | |
|---|---|---|---|---|
| 5,170,165 A | * | 12/1992 | Iihoshi | ............ G01C 21/30 340/995.22 |
| 6,127,931 A | * | 10/2000 | Mohr | ............. G08B 21/0247 340/539.1 |
| 6,297,737 B1 | | 10/2001 | Irvin | |
| 6,895,310 B1 | | 5/2005 | Kolls | |
| 7,479,889 B2 | | 1/2009 | Kazdin et al. | |

(Continued)

*Primary Examiner* — Nizar N Sivji
(74) *Attorney, Agent, or Firm* — Joseph V. Bonadies (57) ABSTRACT

A detection device includes a receiver, an inertial-measurement-unit, an electronic-compass, and a controller-circuit. The receiver determines intensity of a homing-signal transmitted from a vehicle and received at the device. The inertial-measurement-unit determines a distance the device is moved. The electronic-compass determines a heading in which the device is moving. The controller-circuit is in communication with the receiver, the inertial-measurement-unit, and the electronic-compass. The controller-circuit determines a first-range between a first-position of the device and the vehicle. The controller-circuit determines that that the device has moved to a second-position based on a first-distance and a first-heading. The controller-circuit determines a second-range between the second-position and the vehicle. The controller-circuit determines that the device has moved to a third-position based on a second-distance and a second-heading. The controller-circuit determines a third-range between the third-position and the vehicle. The controller-circuit determines a travel-distance and a travel-direction from the device to the vehicle.

32 Claims, 4 Drawing Sheets

(56) References Cited

U.S. PATENT DOCUMENTS

| | | |
|---|---|---|
| 7,548,491 B2 | 6/2009 | Macfarlane |
| 7,696,887 B1 * | 4/2010 | Echavarria ......... G08B 21/0227 340/573.1 |
| 8,335,502 B2 | 12/2012 | Oesterling et al. |
| 8,373,581 B2 | 2/2013 | Hassan et al. |
| 8,494,447 B2 | 7/2013 | Oesterling et al. |
| 8,547,253 B2 | 10/2013 | Proefke et al. |
| 8,571,725 B2 | 10/2013 | Juzswik |
| 9,154,920 B2 | 10/2015 | O'Brien et al. |
| 2003/0034887 A1 * | 2/2003 | Crabtree ................... G01S 3/54 340/539.1 |
| 2003/0231550 A1 | 12/2003 | Macfarlane |
| 2004/0066293 A1 | 4/2004 | Maloney et al. |
| 2004/0130440 A1 | 7/2004 | Boulay et al. |
| 2005/0099275 A1 | 5/2005 | Kamdar et al. |
| 2005/0107673 A1 | 5/2005 | Ball |
| 2007/0050086 A1 * | 3/2007 | Lim ..................... G05D 1/0225 700/245 |
| 2007/0090965 A1 | 4/2007 | McCall |
| 2007/0268110 A1 | 11/2007 | Little |
| 2007/0285230 A1 | 12/2007 | Anglin |
| 2007/0290819 A1 | 12/2007 | Teshima et al. |
| 2009/0091477 A1 | 4/2009 | McCall et al. |
| 2009/0224946 A1 | 9/2009 | King et al. |
| 2010/0076622 A1 | 3/2010 | Dickerhoof et al. |
| 2010/0302102 A1 | 12/2010 | Desai et al. |
| 2010/0305779 A1 | 12/2010 | Hassan et al. |
| 2011/0040424 A1 | 2/2011 | Lickfelt et al. |
| 2011/0133962 A1 | 6/2011 | King et al. |
| 2011/0148573 A1 | 6/2011 | Ghabra et al. |
| 2012/0092129 A1 | 4/2012 | Lickfelt |
| 2012/0244877 A1 | 9/2012 | Margalef et al. |
| 2013/0017816 A1 | 1/2013 | Talty et al. |
| 2013/0188538 A1 | 7/2013 | Kainulainen et al. |
| 2013/0342379 A1 | 12/2013 | Bauman et al. |
| 2014/0058586 A1 | 2/2014 | Kalhous et al. |
| 2014/0129051 A1 | 5/2014 | Gautama et al. |
| 2014/0169564 A1 | 6/2014 | Gautama et al. |
| 2014/0240091 A1 | 8/2014 | Talty et al. |
| 2014/0030897 A1 | 10/2014 | O'Brien |
| 2014/0308971 A1 | 10/2014 | O'Brien et al. |
| 2015/0063329 A1 | 3/2015 | Frye et al. |
| 2015/0109116 A1 | 4/2015 | Grimm et al. |
| 2016/0049033 A1 | 2/2016 | Sigal et al. |
| 2016/0276873 A1 * | 9/2016 | Ben Hanoch ............ H02J 50/12 |
| 2017/0111766 A1 * | 4/2017 | Muramatsu ........... H04W 64/00 |

* cited by examiner

VEHICLE LOCATION DEVICE

CROSS-REFERENCE TO RELATED APPLICATION

This is a continuation application and claims the benefit under 35 U.S.C. § 120 of U.S. patent application Ser. No. 15/980,809, filed May 16, 2018, the entire disclosure of which is hereby incorporated herein by reference.

TECHNICAL FIELD OF INVENTION

This disclosure generally relates to a location device, and more particularly relates to a vehicle location device.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
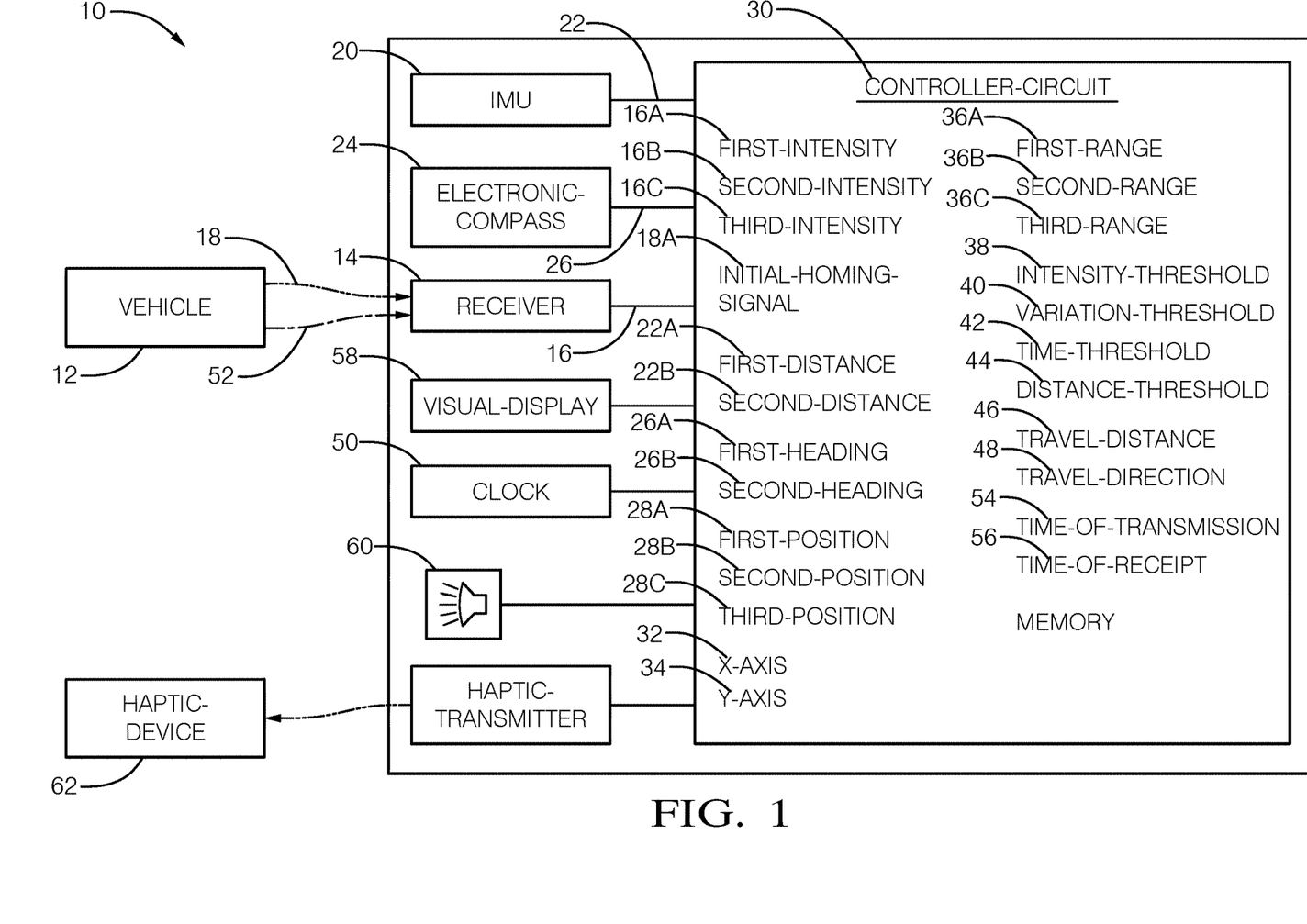
FIG. 1 illustrates a detection device in accordance with one embodiment.

FIG. 1 illustrates a detection device 10, hereafter referred to as the device 10, configured to assist a user to locate a vehicle 12. In the examples described herein, the device 10 is a mobile device 10 that is carried by the user while the user is away from the vehicle 12. As will be described in more detail below, the device 10 is an improvement over other detection-devices, because the device 10 directs the user back to the vehicle 12 without the use of GPS satellites, cellular network, and/or without requiring the device 10 to remember a path taken from the vehicle 12.

The device 10 includes a receiver 14 determining intensity 16 of a homing-signal 18 transmitted from the vehicle 12 and received at the device 10. The receiver 14 is any receiver 14 capable of receiving the homing-signal 18 that conforms to an IEEE 802.15.1-BLUETOOTH® 5.0 LE specification. In the device 10 illustrated in FIG. 1, the intensity 16 of the homing-signal 18 is determined by the known method of received signal strength indicator (RSSI). In the example illustrated in FIG. 1, the homing-signal 18 is received by a single receiver 14.

The device 10 also includes an inertial-measurement-unit 20 (IMU 20) determining a distance 22 the device 10 is moved. The IMU 20 may be any of the known IMU's 20 that are used typically in smartphones and/or other mobile-devices, such as electronic pedometers.

The device 10 also includes an electronic-compass 24 determining a heading 26 in which the device 10 is moving (i.e. a direction of travel). That is, the electronic-compass 24 determines the heading 26 as the device 10 is moved from one position 28 to another position 28. The electronic-compass 24 may be any known electronic-compass 24 that utilizes a magnetometer, such as a MEMS magnetic field sensor.

The device 10 also includes a controller-circuit 30 in communication with the receiver 14, the IMU 20, and the electronic-compass 24. The receiver 14, the IMU 20, and the electronic-compass 24 may be hard-wired to the controller-circuit 30, or may be in wireless communication with the controller-circuit 30. The controller-circuit 30 may include a processor (not shown) such as a microprocessor or other control circuitry such as analog and/or digital control circuitry including an application specific integrated circuit (ASIC) for processing data as should be evident to those in the art. The controller-circuit 30 may include a memory (not specifically shown), including non-volatile memory, such as electrically erasable programmable read-only memory (EEPROM) for storing one or more routines, thresholds, and captured data. The one or more routines may be executed by the processor to perform steps for determining the intensity 16, the heading 26, and the position 28 based on signals received by the controller-circuit 30 from the receiver 14, the IMU 20, and the electronic-compass 24, as described herein.

Figure 2:
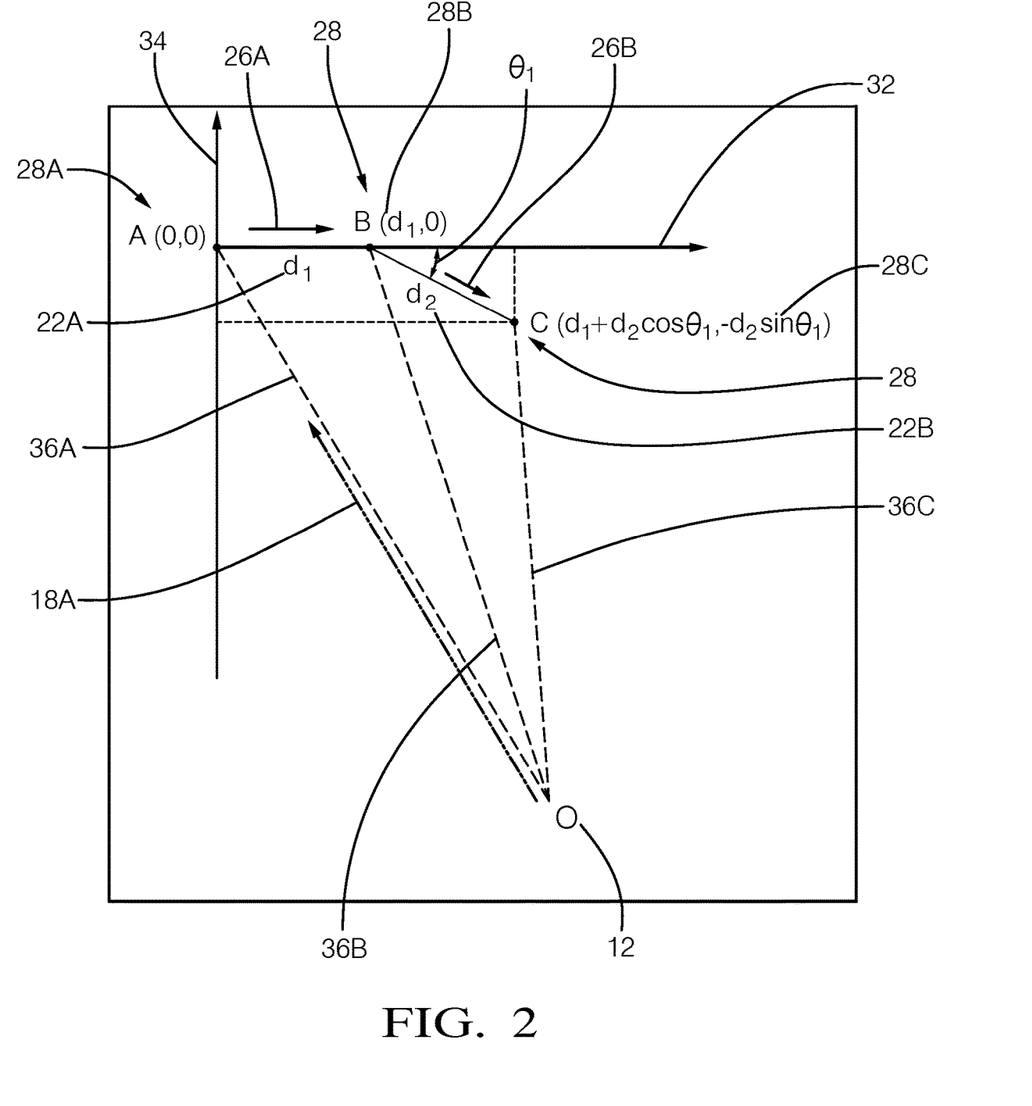
FIG. 2 illustrates a Cartesian coordinate system determined using the detection device of FIG. 1 to locate a vehicle in accordance with one embodiment.

FIG. 2 illustrates a detection scenario where the device 10 is located remotely (illustrated by the letter "A") from the vehicle 12 (illustrated by the letter "O"). A Cartesian coordinate system (i.e., an X-axis 32 and a Y-axis 34) is established by the controller-circuit 30 with first-position 28A of the device 10 defined by coordinates (0,0). The controller-circuit 30 determines a first-range 36A between the first-position 28A of the device 10 and the vehicle 12 based on a first-intensity 16A (see FIG. 1) of the homing-signal 18 using the RSSI as described above. In the examples illustrated in FIGS. 1-2, the homing-signal 18 is broadcast from a transmitter (not shown) located on the vehicle 12. In another embodiment the homing-signal 18 is broadcast from a transmitter located proximate to the vehicle 12 (e.g. from a parking meter or light-post near the vehicle 12). In another embodiment, the vehicle 12 may be in a sleep-mode where the transmitter is not transmitting the homing-signal 18 continuously and is waiting for a wake-up command received by the device 10 to begin transmitting. This has the benefit of conserving battery power. The controller-circuit 30 determines whether the receiver 14 receives an initial-homing-signal 18A (i.e. a first occurrence of a receipt of the homing-signal 18), whereby the controller-circuit 30 designates the first-position 28A in accordance with the determination that the receiver 14 receives the initial-homing-signal 18A (see FIG. 1).

In another embodiment, the controller-circuit 30 determines whether the first-intensity 16A of the homing-signal 18 is greater than an intensity-threshold 38 (see FIG. 1), whereby the controller-circuit 30 designates the first-position 28A in accordance with the determination that the first-intensity 16A of the homing-signal 18 is greater than the intensity-threshold 38. The intensity-threshold 38 may be a user defined level of RSSI and may be a function of the selected transmitter and receiver 14 hardware.

In yet another embodiment, the controller-circuit 30 determines whether the first-intensity 16A of the homing-signal 18 varies less than a variation-threshold 40 (see FIG. 1) for a time greater than a time-threshold 42 (see FIG. 1), whereby the controller-circuit 30 designates the first-position 28A in accordance with the determination that the first-intensity 16A of the homing-signal 18 varies less than the variation-threshold 40 (i.e. a variation of the intensity 16 of the homing-signal 18) for the time greater than the time-threshold 42. The variation-threshold 40 and the time-threshold 42 may be user defined and may be a function of the selected transmitter and receiver 14 hardware. The variation-threshold 40 and the time-threshold 42 may be predefined and stored in the memory of the controller-circuit 30, or may be dynamic and based on factors including a density of other-vehicles and/or a density of structures in a particular area of the vehicle 12 (e.g. an urban area versus a rural area).

Referring back to FIG. 2, in accordance with the determination of the first-range 36A, the controller-circuit 30 determines whether the device 10 has moved to a second-position 28B (illustrated by the letter "B") based on a first-distance 22A moved by the device 10 (illustrated by "$d_1$") and a first-heading 26A indicating the direction the device 10 has moved (illustrated by an arrow). That is, the first-distance 22A is measured between the first-position 28A at coordinates (0,0) and the second-position 28B at coordinates ($d_1$,0), and the first-heading 26A is measured as the device 10 moves from the first-position 28A to the second-position 28B. In the example illustrated in FIG. 2, the first-heading 26A defines the X-axis 32, such that the second-position 28B is located on the X-axis 32 (i.e. the y-coordinate is zero). While defining the X-axis 32 by the first-heading 26A simplifies the geometry used to determine the coordinates of the second-position 28B, the device 10 may optionally establish a fixed Cartesian coordinate system that may be referenced to other coordinate systems, such as a world coordinate system. In another embodiment, the controller-circuit 30 determines whether the first-distance 22A is greater than a distance-threshold 44 (about 0.5-meters), whereby the controller-circuit 30 designates the second-position 28B in accordance with the determination that the first-distance 22A is greater than the distance-threshold 44. The distance-threshold 44 may be used defined and may be based on a resolution of the transmitter and the receiver 14. In another embodiment the controller-circuit 30 determines whether the second-intensity 16B of the homing-signal 18 is greater than the intensity-threshold 38, whereby the controller-circuit 30 designates the second-position 28B in accordance with the determination that the second-intensity 16B of the homing-signal 18 is greater than the intensity-threshold 38. In accordance with the determination that the device 10 has moved to the second-position 28B, the controller-circuit 30 determines a second-range 36B between the second-position 28B and the vehicle 12 based on a second-intensity 16B of the homing-signal 18.

In accordance with the determination of the second-range 36B, the controller-circuit 30 determines whether the device 10 has moved to a third-position 28C (illustrated by the letter "C") based on the a second-distance 22B (illustrated by "$d_2$") and a second-heading 26B (illustrated by another arrow). That is, the second-distance 22B is measured between the second-position 28B at coordinates ($d_1$,0) and the third-position 28C at coordinates ($d_1+d_2 \cos \theta_1$, $-d_2 \sin \theta_1$), and the second-heading 26B is measured as the device 10 moves from the second-position 28B to the third-position 28C. The controller-circuit 30 determines an angle $\theta_1$ based on a difference between the first-heading 26A and the second-heading 26B. In another embodiment, the controller-circuit 30 determines whether the second-distance 22B is greater than the distance-threshold 44, whereby the controller-circuit 30 designates the third-position 28C in accordance with the determination that the second-distance 22B is greater than the distance-threshold 44. In another embodiment, the controller-circuit 30 determines whether the third-intensity 16C of the homing-signal 18 is greater than the intensity-threshold 38, whereby the controller-circuit 30 designates the third-position 28C in accordance with the determination that the third-intensity 16C of the homing-signal 18 is greater than the intensity-threshold 38. In accordance with the determination that the device 10 has moved to the third-position 28C, the controller-circuit 30 determines a third-range 36C between the third-position 28C and the vehicle 12 based on a third-intensity 16C of the homing-signal 18.

Figure 3:
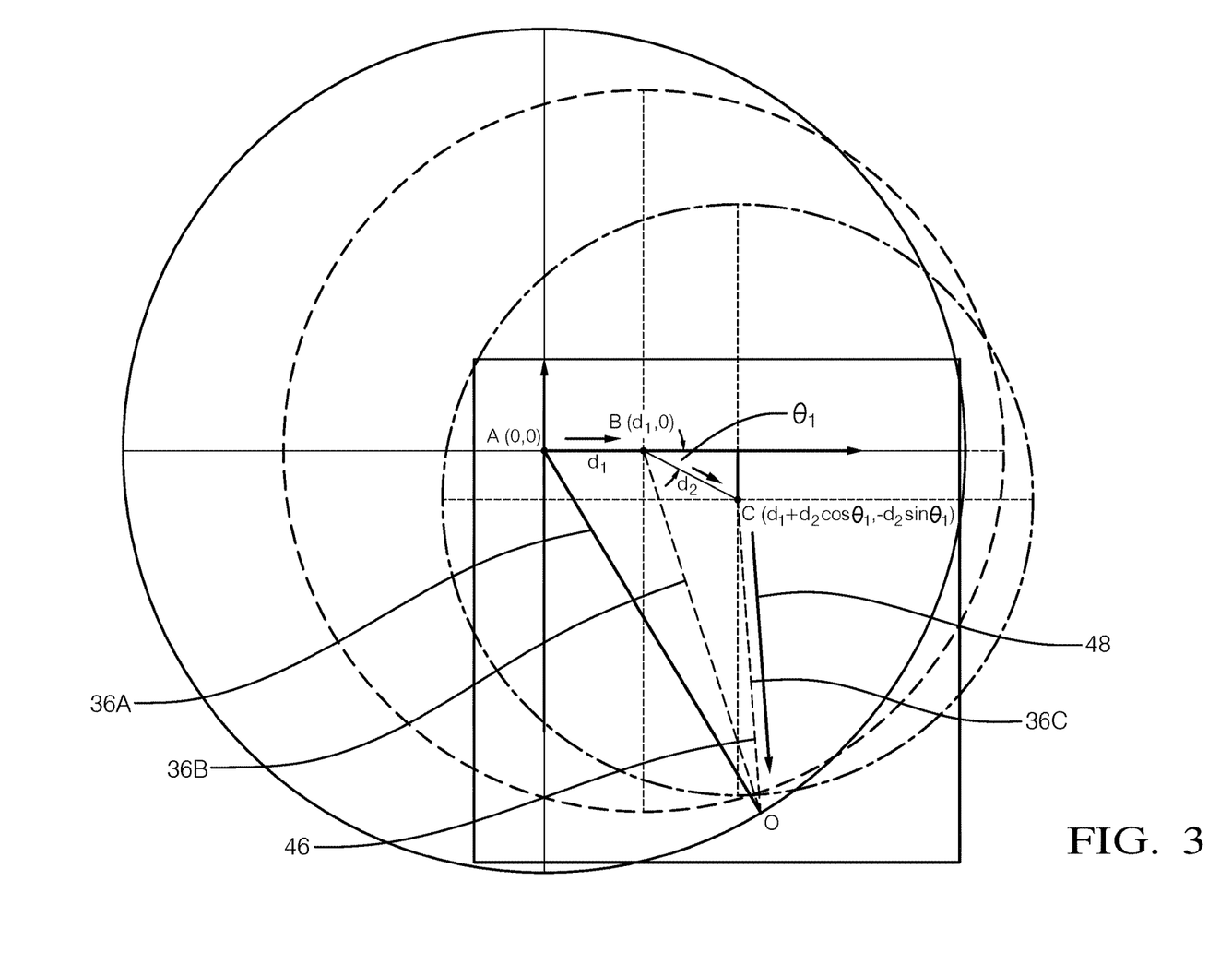
FIG. 3 illustrates a trilateration process using the Cartesian coordinate system of FIG. 2 in accordance with one embodiment.

FIG. 3 illustrates three circles drawn on the Cartesian coordinate system of FIG. 2, where the centers of each of the circles are placed at the coordinates of the first-position 28A, the second-position 28B, and the third-position 28C. The respective radii of the each of the three circles are indicated by the first-range 36A, the second-range 36B, and the third-range 36C. The controller-circuit 30 determines a travel-distance 46 and a travel-direction 48 from the device 10 to the vehicle 12 based on the first-range 36A, the second-range 36B, the third-range 36C, the first-distance 22A, the second-distance 22B, the first-heading 26A, and the second-heading 26B using the known process of trilateration. In the example illustrated in FIG. 3, the third-range 36C is the travel-distance 46. The location of the vehicle 12 is a point where all three of the circles intersect, and the travel-direction 48 is determined based on the coordinates where the three circles intersect.

Referring again to FIG. 1, in another embodiment the device 10 further includes a clock 50 in communication with the controller-circuit 30, and the homing-signal 18 includes a time-stamp 52 indicative of a time-of-transmission 54 indicated by the clock 50 that the homing-signal 18 was transmitted from the vehicle 12. The controller-circuit 30 determines the first-range 36A, the second-range 36B, and the third-range 36C based on a difference between the time-of-transmission 54 and a time-of-receipt 56 of the homing-signal 18 received by the receiver 14. In the example illustrated in FIG. 1, the clock 50 is hard-wired to the controller-circuit 30 and is synchronized with the vehicle 12 by any of the known clock-synchronization methods. In another embodiment, the clock 50 resides in an external infrastructure, such as a cellular transmission station or a satellite, and is in wireless communication with the controller-circuit 30 and the vehicle 12.

In another embodiment, the device 10 further includes a visual-display 58 in communication with the controller-circuit 30, whereby both the travel-distance 46 and the travel-direction 48 to the vehicle 12 are displayed on the visual-display 58 for the user to follow. The visual-display 58 may be any visual-display 58 used in mobile-devices. In the example illustrated in FIG. 1, the visual-display 58 is hard-wired to the controller-circuit 30. In another embodiment the visual-display 58 is in wireless communication with the controller-circuit 30 and is remote from the device 10.

In another embodiment, the device 10 further includes an audible-device 60 in communication with the controller-circuit 30, whereby both the travel-distance 46 and the travel-direction 48 to the vehicle 12 are transmitted through the audible-device 60 for the user to follow. The audible-device 60 may be any audible-device 60 used in mobile-devices. In the example illustrated in FIG. 1, the audible-device 60 is hard-wired to the controller-circuit 30. In another embodiment the audible-device 60 is in wireless communication with the controller-circuit 30.

In an alternative embodiment, the device 10 further includes a haptic-device 62 configured to be worn on a body of a user in communication with the controller-circuit 30, whereby both the travel-distance 46 and the travel-direction 48 to the vehicle 12 are transmitted through the haptic-device 62 to the body of the user and may be useful for a visually impaired user to follow directions to the vehicle 12.

Figure 4:
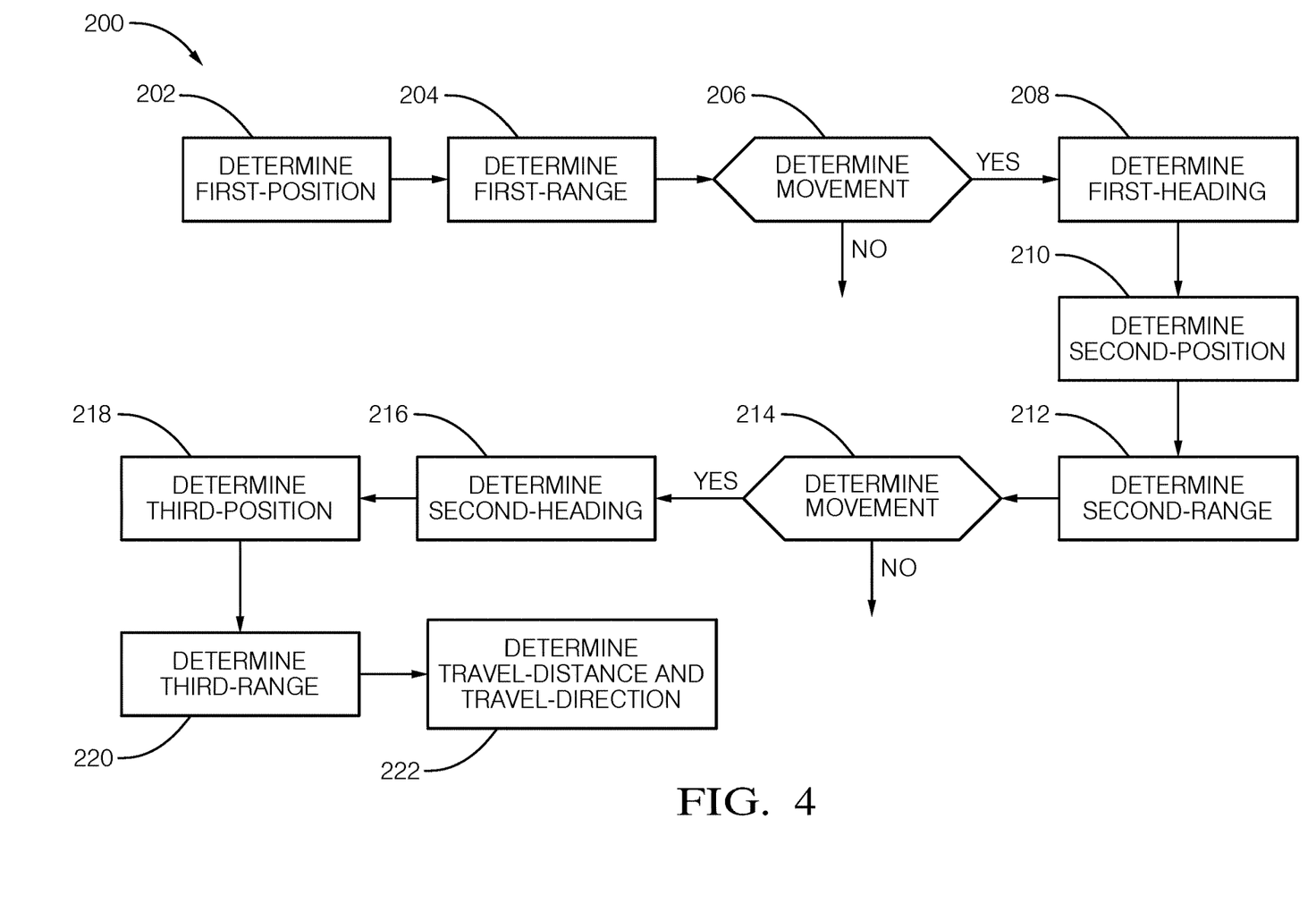
FIG. 4 is a flow chart illustrating a method of using the detection device of FIG. 1 in accordance with another embodiment.

FIG. 4 is a flow chart illustrating another embodiment of a detection method 200, hereafter referred to as the method 200, for using the detection device 10 of FIG. 1, hereafter referred to as the device 10, configured to assist a user to locate a vehicle 12.

Step 202, DETERMINE FIRST-POSITION, includes determining a first-position 28A of the device 10 with a controller-circuit 30 as illustrated in FIG. 2. The controller-circuit 30 determines the first-position 28A when a receiver 14 receives an initial-homing-signal 18A as described above.

Step 204, DETERMINE FIRST-RANGE, includes determining, with the controller-circuit 30, a first-range 36A between the first-position 28A of the device 10 and the vehicle 12 based on a first-intensity 16A of the homing-signal 18 received by a receiver 14 using RSSI as described above.

Step 206, DETERMINE MOVEMENT, includes determining, with the controller-circuit 30, whether the device 10 has moved based on signals received by an inertial-measurement-unit 20 (IMU 20) in communication with the controller-circuit 30 as described above.

Step 208, DETERMINE FIRST-HEADING, includes determining, with the controller-circuit 30, a first-heading 26A indicating the direction the device 10 has moved based on signals received from an electronic-compass 24 in communication with the controller-circuit 30 as described above.

Step 210, DETERMINE SECOND-POSITION, includes determining, with the controller-circuit 30, whether the device 10 has moved to a second-position 28B based on a first-distance 22A moved by the device 10 based on signals received by the IMU 20 as described above. In one embodiment, the controller-circuit 30 designates the second-position 28B in accordance with the determination that the first-distance 22A is greater than a distance-threshold 44. In another embodiment, the controller-circuit 30 designates the second-position 28B in accordance with the determination that a second-intensity 16B of the homing-signal 18 is greater than an intensity-threshold 38.

Step 212, DETERMINE SECOND-RANGE, includes determining, with the controller-circuit 30, a second-range 36B between the second-position 28B of the device 10 and the vehicle 12 based on a second-intensity 16B of the homing-signal 18 received by a receiver 14 using RSSI as described above.

Step 214, DETERMINE MOVEMENT, includes determining, with the controller-circuit 30, whether the device 10 has moved based on signals received by the IMU 20 in communication with the controller-circuit 30.

Step 216, DETERMINE SECOND-HEADING, includes determining, with the controller-circuit 30, a second-heading 26B indicating the direction the device 10 has moved based on signals received from the electronic-compass 24 as described above.

Step 218, DETERMINE THIRD-POSITION, includes determining, with the controller-circuit 30, whether the device 10 has moved to a third-position 28C based on the a second-distance 22B moved by the device 10 from signals received by the IMU 20, and based on the second-heading 26B as described above. In one embodiment, the controller-circuit 30 designates the third-position 28C in accordance with the determination that the second-distance 22B is greater than the distance-threshold 44. In another embodiment, the controller-circuit 30 designates the third-position 28C in accordance with the determination that the third-intensity 16C of the homing-signal 18 is greater than the intensity-threshold 38.

Step 220, DETERMINE THIRD-RANGE, includes determining, with the controller-circuit 30, a third-range 36C between the third-position 28C and the vehicle 12 based on a third-intensity 16C of the homing-signal 18 received by a receiver 14 using RSSI as described above.

Step 222, DETERMINE TRAVEL-DISTANCE & TRAVEL-DIRECTION, includes determining, with the controller-circuit 30, both the a travel-distance 46 and a travel-direction 48 from the device 10 to the vehicle 12 based on the first-range 36A, the second-range 36B, the third-range 36C, the first-distance 22A, the second-distance 22B, the first-heading 26A, and the second-heading 26B using the known process of trilateration. The location of the vehicle 12 is a point where all three of the circles intersect, and the travel-direction 48 is determined based on the coordinates where the three circles intersect as illustrated in FIG. 3.

Accordingly, a detection device 10 (the device 10) and a method 200 of using the device 10 are provided. The device 10 is an improvement over prior art detection-devices because the device 10 directs the user back to the vehicle 12 without the use of GPS satellites and/or without requiring the device 10 to remember a path taken from the vehicle 12.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

We claim:

1. A detection device, said device comprising:
a receiver, the receiver determining intensity of a homing-signal transmitted from a vehicle and received at the device; and
a controller-circuit in communication with the receiver, an inertial-measurement-unit configured to determine a distance the device is moved, and an electronic-compass configured to determine a heading in which the device is moving;
the controller-circuit determining a first-range between a first-position of the device and the vehicle based on a first-intensity of the homing-signal; wherein
the first-intensity varies less than a variation-threshold; wherein
the controller-circuit determines whether the device has moved to a second-position based on a first-distance and a first-heading; and wherein
the controller-circuit determines a second-range between the second-position and the vehicle based on a second-intensity of the homing-signal.

2. The device in accordance with claim 1, wherein the controller-circuit determines whether the receiver receives an initial-homing-signal, whereby the controller-circuit designates the first-position in accordance with the determination that the receiver receives the initial-homing-signal.

3. The device in accordance with claim 1, wherein the controller-circuit determines whether the first-intensity of the homing-signal is greater than an intensity-threshold, whereby the controller-circuit designates the first-position in accordance with the determination that the first-intensity of the homing-signal is greater than the intensity-threshold.

4. The device in accordance with claim 1, wherein the controller-circuit determines whether the first-intensity of the homing-signal varies less than the variation-threshold for a time greater than a time-threshold, whereby the controller-circuit designates the first-position in accordance with the determination that the first-intensity of the homing-signal varies less than the variation-threshold for the time greater than the time-threshold.

5. The device in accordance with claim 1, wherein the controller-circuit determines whether the first-distance is greater than a distance-threshold, whereby the controller-circuit designates the second-position in accordance with the determination that the first-distance is greater than the distance-threshold.

6. The device in accordance with claim 1, wherein the controller-circuit determines whether the second-intensity of the homing-signal is greater than an intensity-threshold, whereby the controller-circuit designates the second-position in accordance with the determination that the second-intensity of the homing-signal is greater than the intensity-threshold.

7. The device in accordance with claim 1, wherein in accordance with the determination of the second-range, the controller-circuit determines whether the device has moved to a third-position based on a second-distance and a second-heading.

8. The device in accordance with claim 7, wherein the controller-circuit determines whether the second-distance is greater than a distance-threshold, whereby the controller-circuit designates the third-position in accordance with the determination that the second-distance is greater than the distance-threshold.

9. The device in accordance with claim 7, wherein in accordance with the determination that the device has moved to the third-position, the controller-circuit determines a third-range between the third-position and the vehicle based on a third-intensity of the homing-signal.

10. The device in accordance with claim 9, wherein the controller-circuit determines whether the third-intensity of the homing-signal is greater than an intensity-threshold, whereby the controller-circuit designates the third-position in accordance with the determination that the third-intensity of the homing-signal is greater than the intensity-threshold.

11. The device in accordance with claim 9, wherein the device further includes a clock in communication with the controller-circuit, and wherein the homing-signal includes a time-stamp indicative of a time-of-transmission indicated by the clock that the homing-signal was transmitted from the vehicle, whereby the controller-circuit determines the first-range, the second-range, and the third-range based on a difference between the time-of-transmission and a time-of-receipt of the homing-signal received by the receiver.

12. The device in accordance with claim 9, wherein the controller-circuit determines a travel-distance and a travel-direction from the device to the vehicle based on the first-range, the second-range, the third-range, the first-distance, the second-distance, the first-heading, and the second-heading.

13. The device in accordance with claim 12, wherein the device further includes a visual-display in communication with the controller-circuit, whereby both the travel-distance and the travel-direction to the vehicle are displayed on the visual-display.

14. The device in accordance with claim 12, wherein the device further includes an audible-device in communication with the controller-circuit, whereby both the travel-distance and the travel-direction to the vehicle are transmitted through the audible-device.

15. The device in accordance with claim 1, wherein the device is a smartphone.

16. The device in accordance with claim 1, wherein the homing-signal is received by a single receiver.

17. A detection method, said method comprising:
determining an intensity of a homing-signal transmitted from a vehicle, with a receiver installed in a device;
determining, with a controller-circuit in communication with the receiver, an inertial-measurement-unit configured to determine a distance the device is moved, and an electronic-compass configured to determine a heading in which the device is moving, a first-range between a first-position of the device and the vehicle based on a first-intensity of the homing-signal, wherein the first-intensity varies less than a variation-threshold;
determining, with the controller-circuit, whether the device has moved to a second-position based on a first-distance and a first-heading; and
determining, with the controller-circuit, a second-range between the second-position and the vehicle based on a second-intensity of the homing-signal.

18. The method in accordance with claim 17, further including the step of determining, with the controller-circuit, whether the receiver receives an initial-homing-signal, whereby the controller-circuit designates the first-position in accordance with the determination that the receiver receives the initial-homing-signal.

19. The method in accordance with claim 17, further including the step of determining, with the controller-circuit, whether the first-intensity of the homing-signal is greater than an intensity-threshold, whereby the controller-circuit designates the first-position in accordance with the determination that the first-intensity of the homing-signal is greater than the intensity-threshold.

20. The method in accordance with claim 17, further including the step of determining, with the controller-circuit, whether the first-intensity of the homing-signal varies less than the variation-threshold for a time greater than a time-threshold, whereby the controller-circuit designates the first-position in accordance with the determination that the first-intensity of the homing-signal varies less than the variation-threshold for the time greater than the time-threshold.

21. The method in accordance with claim 17, further including the step of determining, with the controller-circuit, whether the first-distance is greater than a distance-threshold, whereby the controller-circuit designates the second-position in accordance with the determination that the first-distance is greater than the distance-threshold.

22. The method in accordance with claim 17, further including the step of determining, with the controller-circuit, whether the second-intensity of the homing-signal is greater than an intensity-threshold, whereby the controller-circuit designates the second-position in accordance with the determination that the second-intensity of the homing-signal is greater than the intensity-threshold.

23. The method in accordance with claim 17, further including the step of determining, with the controller-circuit, whether the device has moved to a third-position based on a second-distance and a second-heading.

24. The method in accordance with claim 23, further including the step of determining, with the controller-circuit, whether the second-distance is greater than a distance-threshold, whereby the controller-circuit designates the third-position in accordance with the determination that the second-distance is greater than the distance-threshold.

25. The method in accordance with claim 23, further including the step of determining, with the controller-circuit, a third-range between the third-position and the vehicle based on a third-intensity of the homing-signal.

26. The method in accordance with claim 25, further including the step of determining, with the controller-circuit, whether the third-intensity of the homing-signal is greater than an intensity-threshold, whereby the controller-circuit designates the third-position in accordance with the determination that the third-intensity of the homing-signal is greater than the intensity-threshold.

27. The method in accordance with claim 25, wherein the device further includes a clock in communication with the controller-circuit, and wherein the homing-signal includes a time-stamp indicative of a time-of-transmission indicated by the clock that the homing-signal was transmitted from the vehicle, further including the step of determining, with the controller-circuit, the first-range, the second-range, and the third-range based on a difference between the time-of-transmission and a time-of-receipt of the homing-signal received by the receiver.

28. The method in accordance with claim 25, further including the step of determining, with the controller-circuit, a travel-distance and a travel-direction from the device to the vehicle based on the first-range, the second-range, the third-range, the first-distance, the second-distance, the first-heading, and the second-heading.

29. The method in accordance with claim 28, wherein the device further includes a visual-display in communication with the controller-circuit, further including the step of displaying both the travel-distance and the travel-direction to the vehicle on the visual-display.

30. The method in accordance with claim 28, wherein the device further includes an audible-device in communication with the controller-circuit, further including the step of transmitting both the travel-distance and the travel-direction to the vehicle through the audible-device.

31. The method in accordance with claim 17, wherein the device is a smartphone.

32. The method in accordance with claim 17, wherein the homing-signal is received by a single receiver.

* * * * *